United States Patent [19]

Arino et al.

[11] Patent Number: 4,611,526
[45] Date of Patent: Sep. 16, 1986

[54] REACTION TRANSMITTING MECHANISM FOR BRAKE BOOSTER

[75] Inventors: Masao Arino, Higashimatsuyama; Yoshimichi Inoue, Saitama, both of Japan

[73] Assignee: Jidosha Kiki Co., Ltd., Tokyo, Japan

[21] Appl. No.: 732,483

[22] Filed: May 9, 1985

[30] Foreign Application Priority Data

May 22, 1984 [JP] Japan .................................. 58-75020

[51] Int. Cl.$^4$ ............................................. F15B 9/10
[52] U.S. Cl. ................................................. 91/369 A
[58] Field of Search ............. 91/369 A, 369 C, 369 B, 91/369 R, 371; 60/554

[56] References Cited

U.S. PATENT DOCUMENTS 3,279,327 10/1966 French ............................. 91/369 A
3,543,298 11/1970 Rockwell ............................. 60/554

Primary Examiner—Robert E. Garrett
Assistant Examiner—Mark A. Williamson
Attorney, Agent, or Firm—Flynn, Thiel, Boutell & Tanis

[57] ABSTRACT

The invention relates to a reaction transmitting mechanism for use in a brake booster in which a reaction from an output shaft is transmitted to an input shaft through a reaction disc and a valve plunger. A reaction transmitting member is interposed between the reaction disc and the valve plunger so that a reaction from the reaction disc is transmitted to the valve plunger through a plurality of paths including and not including the reaction transmitting member. When the brake is actuated, the reaction is transmitted through the reaction transmitting member. On the other hand, when the brake is released, the transmission of a reaction through the reaction transmitting member is halted. In this manner, it is possible to change the servo ratio between the actuation and the release of the brake.

5 Claims, 3 Drawing Figures

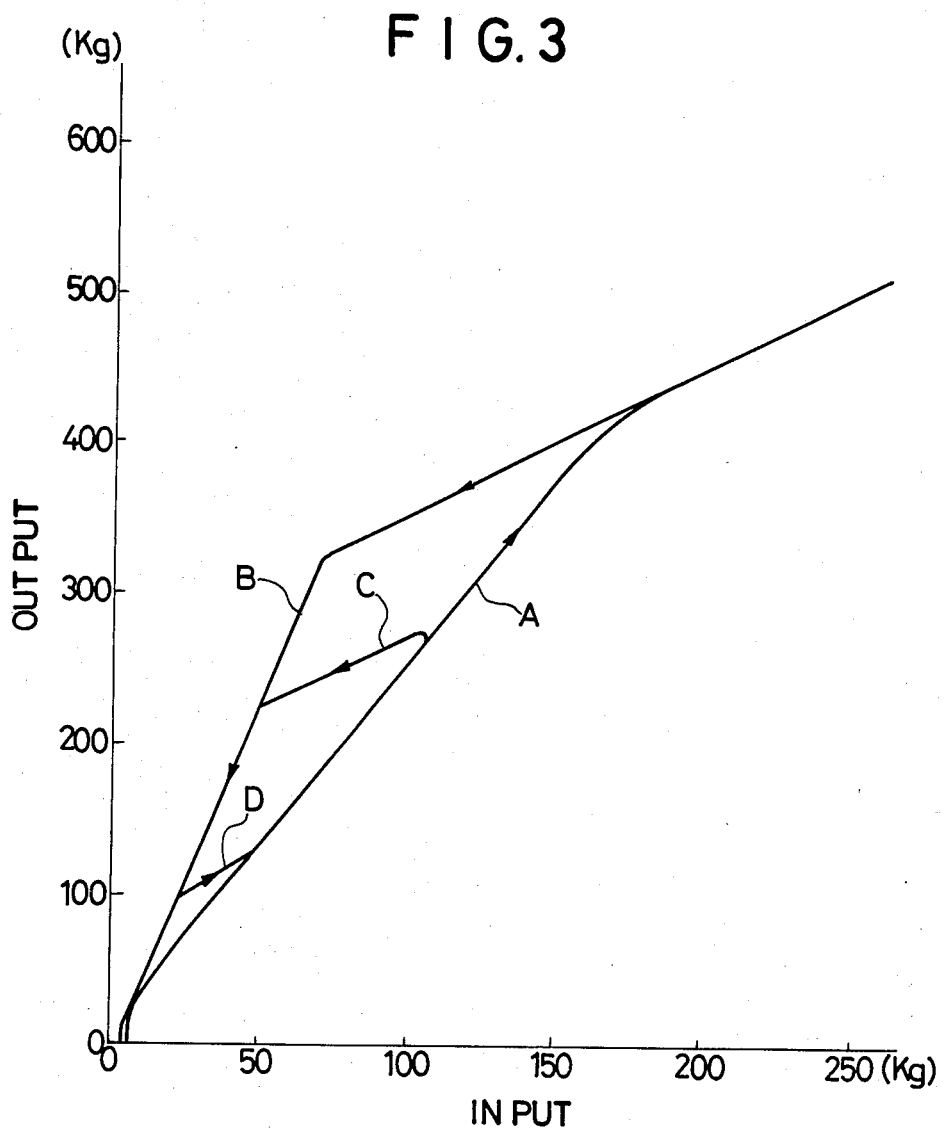

REACTION TRANSMITTING MECHANISM FOR BRAKE BOOSTER

FIELD OF THE INVENTION

The invention relates to a reaction transmitting mechanism for brake booster, and more particularly, to such mechanism in which a reaction from an output shaft is transmitted to an input shaft through a reaction disc and a valve plunger.

DESCRIPTION OF THE PRIOR ART

Generally in a brake booster, an input and an output are in a proportional relationship, referred to as a servo ratio, during an intermediate load condition. It is known in the art that there is some difference in the output due to hysteresis for a given input of an equal magnitude between when a brake is operated and when the brake is released. Any difference in the output which occurs between the two situations is of minimal magnitude, and the two outputs can be considered as substantially identical as viewed from the servo ratio relationship. Hence, it has not been possible to change the servo ratio freely between the actuation and the release of the brake.

It is recognized that a brake booster having an increased servo ratio generally tends to develop a braking force of an increased magnitude in a rapid manner when a brake pedal is depressed, and requires an input of a reduced magnitude when it is desired to maintain a braking force of a given magnitude. Consequently, there are some difficulties in respect of the operating ease and the brake feeling, and there has been a need for improvements in these respects.

SUMMARY OF THE INVENTION

It is an object of the invention to permit a free choice of a servo ratio between the actuation and the release of a brake, thereby allowing an improvement in the operating ease and the brake feeling.

The above object is accomplished in accordance with the invention by a brake booster in which a reaction from an output shaft is transmitted to an input shaft through a reaction disc and a valve plunger. A reaction transmitting member is interposed between the reaction disc and the valve plunger to provide a plurality of paths for transmission of the reaction from the reaction disc to the valve plunger, namely, one including the transmitting member and another not including the transmitting member. The reaction is transmitted through the reaction transmitting member when the brake is actuated while the transmission of the reaction through the reaction transmitting member is interrupted when the brake is released. In this manner, a change in the servo ratio is enabled between the actuation, and the release of the brake.

Other objects, features and advantages of the invention will become apparent from the following description with reference to the attached drawings which illustrate an embodiment of the invention.

BRIEF DESCRIPTION OF THE DRAWINGS

FIG. 3 graphically shows a characteristic curve which is provided by the present invention.

DETAILED DESCRIPTION OF EMBODIMENT

Figure 1:
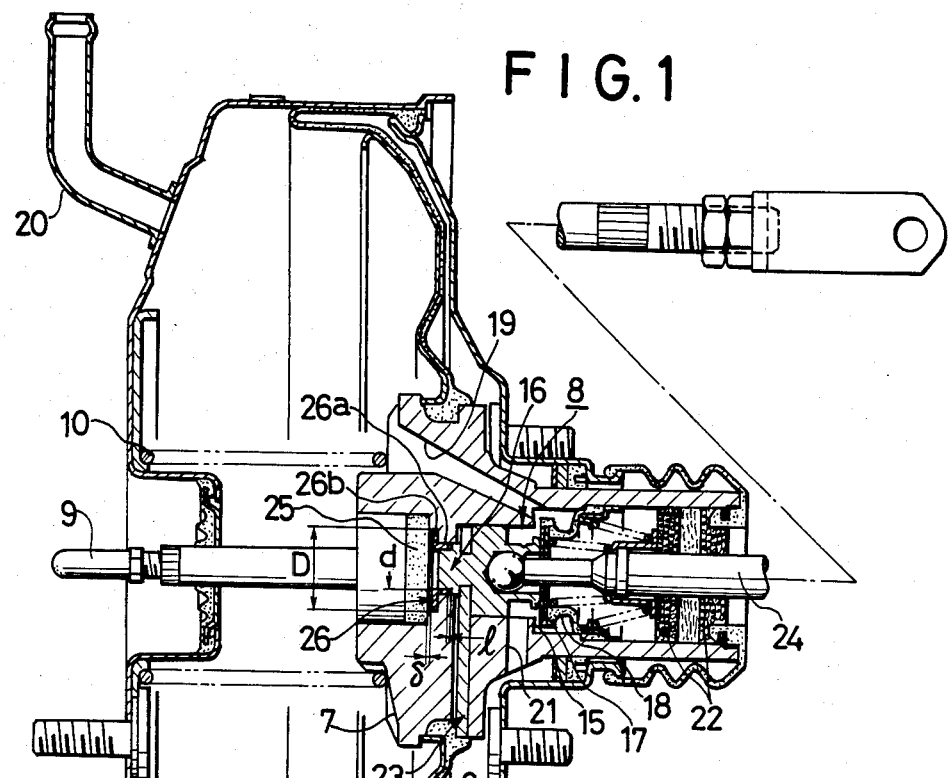
FIG. 1 is a longitudinal section of one embodiment of the invention.

Referring to the drawings, an embodiment of the invention will be described below. FIG. 1 shows a front shell 1 and a rear shell 2 which defines a sealed enclosure in which a power piston 3 and a diaphragm 4, applied to the rear surface of the power piston 3, are disposed. The combination of the power piston 3 and the diaphragm 4 divided the interior of the enclosure into a forwardly located constant pressure chamber 5 and a rearwardly located variable pressure chamber 6.

The power piston 3 has a shank portion which is integrally provided with a valve body 7 containing a valve mechanism 8 which is used to switch a fluid circuit. A push rod 9 functioning as an output shaft has its one end slidably fitted in and held by the valve body 7. Both the power piston 3 and the valve body 7 are normally urged to their inoperative positions shown by a return spring 10.

The valve mechanism 8 comprise a first valve seat 15 formed on the valve body 7, a second valve seat 17 formed on a valve plunger 16, and a valve element 18, formed of an elastic material and which is adapted to be seated upon either valve seat 15 or 17 from the right-hand side, as viewed in FIG. 1. It will be noted that the space surrounding the first valve seat 15 communicates with the constant pressure chamber 5 through a passage 19 which is formed to extend through the valve body 7, and the constant pressure chamber 5 communicates with a source of negative pressure such as an intake manifold of an engine, not shown, through a negative pressure introduction pipe 20 which is connected to the front shell 1. The space located between the first and second valve seat 15, 17 communicates with the variable pressure chamber 6 through a passage 21 formed in the valve body 7. Finally, the space within the second valve seat 17 communicates with the atmosphere through a filter 22.

A key member 23 prevents the withdrawal of the valve plunger 16 from within the valve body 7, and the valve plunger is connected to an input shaft 24 which is in turn coupled to a brake pedal, not shown. It will be seen that the front end face of the valve plunger 16 is disposed in opposing relationship with one end face of a reaction disc 25, the other end face of which is disposed in abutting relationship with the end face of the push rod 9 at said one end thereof.

Figure 2:
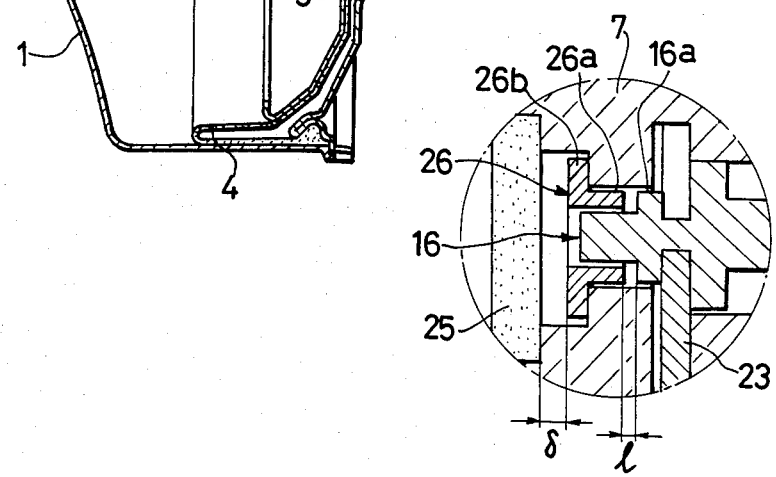
FIG. 2 is an enlarged section of part of the arrangement shown in FIG. 1.

As shown in enlarged form in FIG. 2, a reaction transmitting member 26 is interposed between the valve body 7 and the valve plunger 16 on one hand and the reaction disc 25 on the other hand. The reaction transmitting member 26 is an annular member which is L-shaped in cross section, having a cylindrical shank portion 26a in which the valve plunger 16 is slidably fitted. The transmitting member 26 also has a flange portion 26b, which is interposed between the valve body 7 and the reaction disc 25.

In its inoperative position shown, the right end face of the cylindrical shank portion 26a of the transmitting member 26 opposes to and is spaced by a given clearance 1 from a step 16a formed in the valve plunger 16 which is slidably fitted in the shank potion 26a. The front end face of the transmitting member 26 opposes to and is spaced by a given clearance δ from the opposite end face of the reaction disc 25. The magnitude of the clearance 1 is chosen such that a contact is established between the reaction transmitting member 26 and the valve plunger 16 before the valve element 18 is seated upon the first valve seat 15 and the second valve seat 17 moves away from the valve element 18 as the valve plunger 16 moves in a forward direction. The clearace δ has a magnitude greater than that of the clearance 1.

In operation, when a brake pedal, not shown, is depressed to move the input shaft 24 and the valve plunger 16 to the left, the valve element 18 is seated upon the first valve seat 15 to interrupt the communication between the constant pressure and the variable pressure chamber 5, 6 while establishing a communication between the atmosphere and the variable pressure chamber 6 as a result of movement of the second valve seat 17 away from the valve element 18, thus introducing the atmospheric pressure into the variable pressure chamber 6. Consequently, a pressure differential across the power piston 3 causes it to move forward against the resilience of the return spring 10 in the same manner as occurs in a conventional brake booster.

Under this condition, the reaction applied to the output shaft 9 causes an elastic deformation of the reaction disc 25, generally in the same manner as in a conventional brake booster, shortening the clearance δ to achieve a contact between the reaction disc 25 and the valve plunger 16. Consequently, the reaction applied to the output shaft is transmitted directly to the valve plunger 16 from the reaction disc 25, and thence to the brake pedal through the input shaft 24.

At the same time, since the second valve seat 17 on the valve plunger 16 has further moved forward beyond its disengagement from the valve element 18 when the brake is actuated, the step 16a formed in the valve plunger 16 abuts against the cylindrical shank portion 26a of the reaction transmitting member 26 to cause it to move forwardly in an integral manner before the second valve seat 17 moves away from the valve element 18. Consequently, the reaction applied to the output shaft 9 is transmitted to the valve plunger 16 through the reaction disc 25 and the reaction transmitting member 26.

It will be seen therefore that when the brake is actuated, the reaction is transmitted from the reaction disc 25 directly to the valve plunger 16 and is also transmitted to the valve plunger 16 through the reaction transmitting member 26. Under this condition, the contact between the reaction disc 25 and the valve plunger 16 occurs over a relatively large area (see diameter D shown in FIG. 1), whereby a reaction of an increased magnitude is transmitted to the brake pedal, thus reducing the servo ratio as shown by reference character A in FIG. 3.

If the brake is now released, the valve element 18 of the valve mechanism 8 becomes seated upon the second valve seat 17 to interrupt the communication between the atmosphere and the variable pressure chamber 6 and moves away from the first valve seat 15 to cause the variable pressure chamber 6 to communicate with the constant pressure chamber 5, whereby the power piston 3 is returned to its inoperative position under the action of the return spring 10.

When the brake is released in this manner, the valve plunger 16 retracts to a position where the valve element 18 is disengaged from the first valve seat 15, and hence the reaction transmitting member 26 abuts against the valve body 7 before the valve plunger 16 retracts to such position, whereby a further retracting movement of the transmitting member 26 is prevented. In other words, the valve plunger 16 is separated from the reaction transmitting member 26. The reaction disc 25 continues to be elastically deformed by the reaction and thus is maintained in abutment against the valve plunger 16 even under this condition, and hence the reaction continues to be transmitted to the brake pedal. However, the contact between the reaction disc 25 and the valve plunger 16 occurs over a relatively small area (refer diameter d in FIG. 1) at this time, and hence a reaction of a reduced magnitude is transmitted to the brake pedal, thus increasing the servo ratio as indicated by reference character B in FIG. 3.

In FIG. 3, reference character C represents the operating characteristic of the booster when it is loaded at an intermediate level as it changes from the brake actuated to its brake released condition. Reference character D represents the operating characteristic of the booster for the opposite process.

While the invention has been illustrated and described above in connection with an embodiment thereof, it should be understood that a number of changes, modifications and substitutions therein will readily occur to one skilled in the art without departing from the scope and spirit of the invention as defined by the appended claims.

What is claimed is:

1. A reaction transmitting mechanism for brake booster which includes a valve mechanism for controlling the opening or closing of a path for fluid in accordance with a corresponding forward or rearward movement of a valve plunger which is mechanically coupled to an input shaft, an output shaft having one end slidably fitted in a valve body in which the valve mechanism is disposed, and a reaction disc interposed between said one end of the output shaft and the valve plunger for transmitting a reaction force from the output shaft to the input shaft through the reaction disc and the valve plunger; the reaction transmitting mechanism comprising a reaction transmitting member interposed between the reaction disc and the valve plunger so as to be movable toward or away from the valve body, the reaction force being transmitted from the reaction disc to the valve plunger through a transmission path including the reaction transmitting member and a transmission path not including the reaction transmitting member, first means on said valve plunger and reaction transmitting member responsive to initiation of braking movement of said valve plunger for application of said reaction force from said reaction disc to said valve plunger simultaneously through both said transmission paths, namely directly to the valve plunger and indirectly to the valve plunger through the reaction transmitting member, such that the reaction disc and the valve plunger are coupled together through the reaction transmitting member when the brake is initially actuated, second means on said valve body and reaction transmitting member responsive to initiation of brake release movement of said valve plunger for reducing application of said reaction force from said reaction disc to said valve plunger to only one said transmission path, namely only directly to the valve plunger and not through said reaction transmitting member, said second means including initially abutable surface means on said valve body and reaction transmitting member engageable upon initial retraction of said valve plunger for limiting the retracting movement of the reaction transmitting member to uncouple the latter from the valve plunger and allow completion of retracting movement of the valve plunger without the reaction transmitting member.

2. A reaction transmitting mechanism according to claim 1, the brake booster including a power piston, a constant pressure chamber and a variable pressure chamber defined respectively forwardly and rearwardly of said power piston and having a path of communication alternately established and interrupted by movement of said valve plunger, a source of fluid associated with said variable pressure chamber through a path of communication alternately established and interrupted by said valve plunger, said first means including abutable surface means on said valve plunger and reaction transmitting member, in which a clearance is formed between the reaction transmitting member and the valve plunger which is chosen such that a contact between the reaction transmitting member and the valve plunger is established before the valve mechanism interrupts the communication between the constant pressure chamber and the variable pressure chamber and communicates between the variable pressure chamber and the source of fluid.

3. A reaction transmitting mechanism according to claim 1 in which the reaction transmitting member includes an axially extending cylindrical portion slidably fitted in an annular passage between the valve body and the front end of the valve plunger, the valve plunger having a front end face which is disposed in opposing relationship with the reaction disc, a step formed in the valve plunger being disposed in opposing relationship with a rear end face of the cylindrical portion.

4. A reaction transmitting mechanism according to claim 1 in which the reaction transmitting member includes a cylindrical portion and a flange portion which extends radially outward from an end of the cylindrical portion located nearer the reaction disc, the flange portion being directly abutable against the valve body to limit retracting movement of the reaction transmitting member.

5. A reaction transmitting mechanism for brake booster which includes a valve mechanism for controlling the opening or closing of a path for fluid in accordance with a corresponding forward or rearward movement of a valve plunger which is mechanically coupled to an input shaft, an output shaft having one end slidably fitted in a valve body in which the valve mechanism is disposed, and a reaction disc interposed between said one end of the output shaft and the valve plunger for transmitting a reaction from the output shaft to the input shaft through the reaction disc and the valve plunger; the reaction transmitting mechanism comprising a reaction transmitting member interposed between the reaction disc and the valve plunger so as to be movable toward or away from the valve body, the reaction transmitting member being disposed for abutment against the valve body at a given retracted position of the reaction transmitting member toward the valve plunger to thereby limit retracting movement of the reaction transmitting member, the reaction being transmitted from the reaction disc to the valve plunger through a plurality of transmitting paths including and not including the reaction transmitting member, the arrangement being such that in the reaction transmitting path which includes the reaction transmitting member, the reaction disc and the valve plunger are coupled together through the reaction transmitting member when the brake is actuated, and the retracting movement of the reaction transmitting member is limited to uncouple the reaction transmitting member from the valve plunger when the brake is released, in which a front end face of the reaction transmitting member is disposed in opposing relationship with an opposite end face of the reaction disc with a given clearance therebetween.

* * * * *